Jan. 27, 1942.　　　C. R. WEISS　　　2,271,166
BELT CONVEYER IDLER
Filed Aug. 3, 1940　　　4 Sheets-Sheet 1
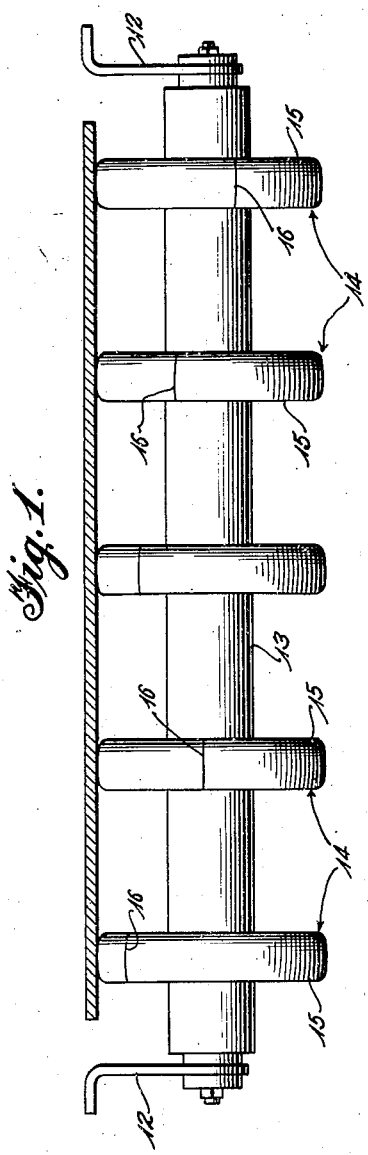
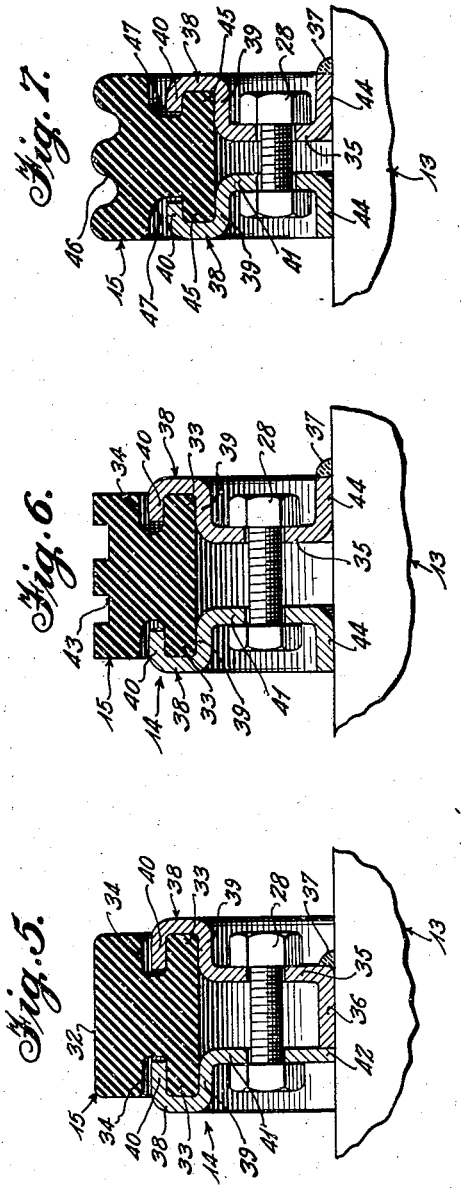
Inventor
Charles R. Weiss Jan. 27, 1942.   C. R. WEISS   2,271,166
BELT CONVEYER IDLER
Filed Aug. 3, 1940   4 Sheets-Sheet 2
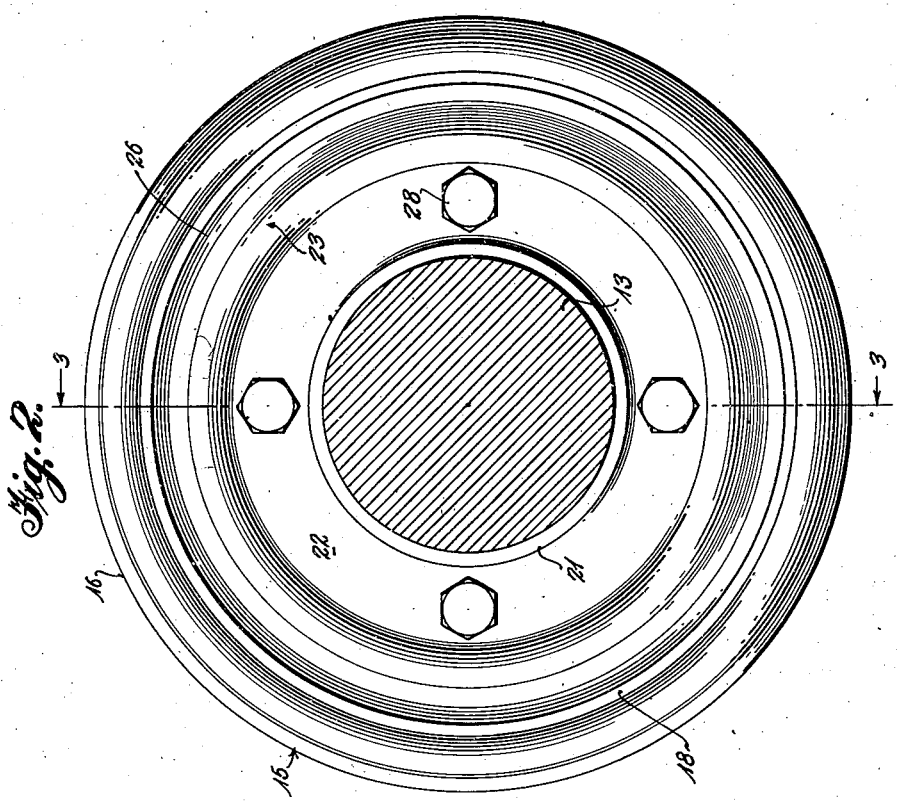
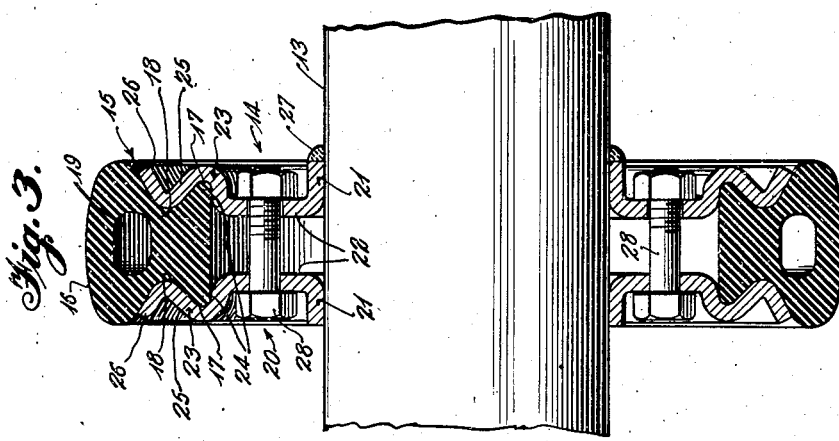
Inventor
Charles R. Weiss
By L. Donald Tongue
Attorney Jan. 27, 1942. C. R. WEISS 2,271,166
BELT CONVEYER IDLER
Filed Aug. 3, 1940 4 Sheets-Sheet 3
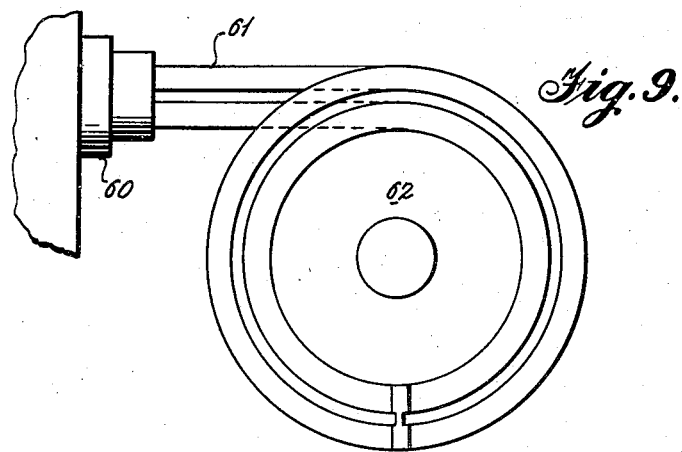
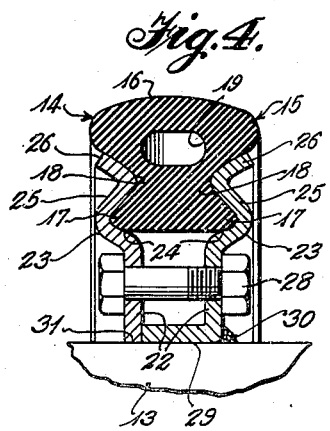
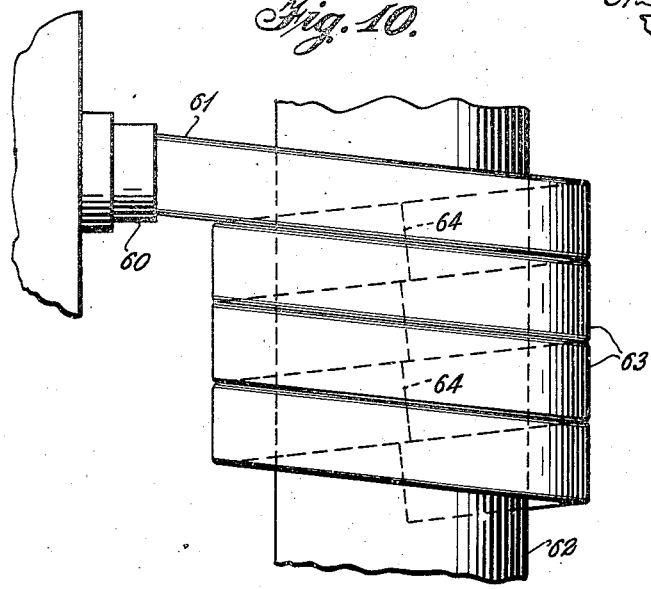
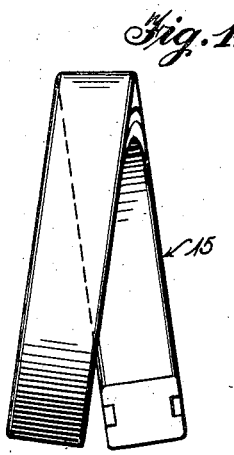
Inventor
Charles R. Weiss
By L. Donald Myers
Attorney

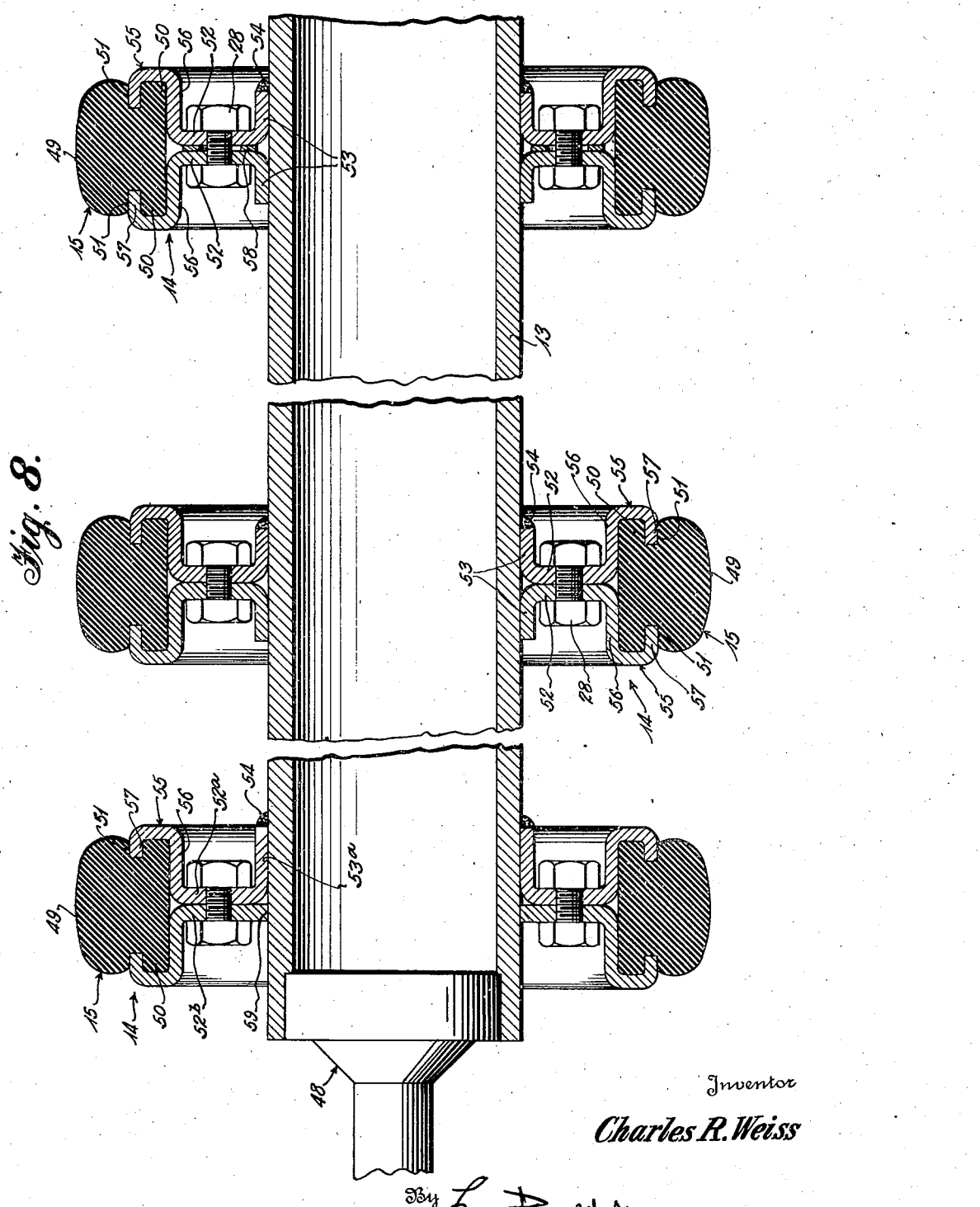

Patented Jan. 27, 1942

2,271,166

UNITED STATES PATENT OFFICE 2,271,166

BELT CONVEYER IDLER

Charles R. Weiss, Indianapolis, Ind., assignor to Link-Belt Company, a corporation of Illinois Application August 3, 1940, Serial No. 350,786

8 Claims. (Cl. 74—230.8)

This invention relates to belt conveyer idlers and deals more specifically with idlers having rolls primarily intended for use in flatly supporting the return runs of conveyer belts although they may be employed for flatly supporting active runs if so desired. The idlers embodying this invention constitute improvements insofar as manufacturing and maintenance costs are concerned over the idlers disclosed in the patent to Amos Searles, et al., 2,052,900, and the patents to Charles R. Weiss et al., 2,169,623, 2,169,624, and 2,169,625.

The aforementioned patents disclose idler structures which are particularly adapted for handling abrasive and corrosive materials because the rolls are provided with rubber tread portions which will resist the destructive action of such materials. The rubber tread portions of the rolls are intended to accomplish the additional, very desirable feature of absorbing shocks applied to the active runs of the belt by the conveyed material when it is delivered to the belt by gravity and when the material passes over the high points of the runs which are produced by the idlers.

The several roll structures disclosed in the aforementioned patents have proved to be very satisfactory in resisting abrasive and corrosive attacks. The structures of the Charles R. Weiss et al. patents have proved to be much more satisfactory in absorbing shocks delivered to the belts by the conveyed material and to support the loads of the active runs because of the continuous or substantially continuous supporting surfaces provided by the tread portions of the rolls. The structures of the Amos Searles et al. patent have been found to provide adequate support for the unloaded return runs of belts.

As stated above, the structures embodying this invention constitute improvements over the structures disclosed in the above noted patents and particularly the structures disclosed in the Amos Searles et al. patent when used as return run idlers.

For example, the roll structures of the said patents all embody a plurality of continuous rings or annular members which are formed of rubber, or some other suitable resilient material, and which are assembled on tubular or solid cylindrical supports or shafts by being threaded over the ends thereof. They are provided with relatively tight fits on the supports or shafts so that they may deliver radial thrusts applied thereto directly to the said supports. Spacing and retaining means of several different types are employed for holding the rings or annular members in proper spaced relation on the supports. These spacing and retaining means are in most cases of annular form and are threaded over the ends of the supports. These structural arrangements possess several undesirable features which may be enumerated as follows:

1. Due to the continuous ring or annular formation of the resilient tread members and the spacing and retaining means, it is necessary to assemble and disassemble all of these parts by passing them, in a definite sequence, over an end of their support, and they, naturally, must be moved axially of the support during these operations.

2. The need for maintaining a definite sequence with several differently shaped and arranged parts in fabricating an idler structure requires considerable assembly time for each unit and adds to the manufacturing costs.

3. The replacement of one or more badly worn or damaged rings or annular members makes it necessary to completely disassemble and reassemble all of the parts arranged between the point or points of repair and the nearest end or ends of the support, thereby making repairs unnecessarily costly.

4. Endless rubber rings or annular members must be independently pit molded, which makes them an expensive item.

5. The direct mounting of all of the rings or annular members on a common support or shaft makes it necessary for each ring to have a considerable radial dimension or thickness because the diameter of the solid or tubular support or shaft must be kept within practical limits.

6. When parts of the periphery of the common tubular or solid support or shaft are exposed, these surfaces are ravaged by the corrosive action of the materials being handled. As a result, the movement of parts over these damaged areas creates an extremely troublesome problem in making repairs.

It is the primary object of this invention to provide belt conveyer idlers which will resist abrasive and corrosive attack and which may be manufactured at a low cost and maintained with very little trouble and expense.

More specifically stated, it is the purpose of this invention to provide belt conveyer idler structures which may be manufactured at a very low cost due to the small number of parts employed, the ease with which they may be assembled, the need for only a minimum amount of material for each tire or tread member, and the comparatively inexpensive method of manufacturing the said tires or tread members; and which may be easily and inexpensively maintained because it is not necessary to disassemble or disturb in any way any of the rolls which are not directly involved in the replacement of worn or damaged tires or tread members because the tires or tread members which must be replaced are not moved along the common support or shaft during the servicing operation.

Other objects and advantages of the invention will be apparent during the course of the following description.

In the accompanying drawings forming a part of this specification and in which like numerals are employed to designate like parts throughout the same, Figure 1 is an elevational view of a belt conveyer idler embodying this invention and illustrating the idler as flatly supporting a run of a conveyer belt, Figure 2 is a side elevational view of one form of idler roll embodying this invention, Figure 3 is a transverse sectional view taken on line 3—3 of Figure 2, Figure 4 is a fragmentary transverse sectional view of another modified form of idler roll, Figures 5, 6, and 7 are views similar to Fig. 4 and illustrate three additional modified forms of idler rolls, Figure 8 is a fragmentary, longitudinal sectional view of a belt conveyer idler and illustrates modifications of the central support or shaft and the idler rolls, Figures 9 and 10 are elevation and plan views, respectively, illustrating the step of extruding and winding in helical form the stock from which the tires or tread members of the various idler roll structures are cut, and Figure 11 is an elevational view of a tire or tread member after it has been cut from the helical stock shown in Figs. 9 and 10.

In the drawings, wherein for the purpose of illustration are shown the preferred embodiments of this invention, and particularly referring to Fig. 1, there is disclosed a belt conveyer idler assembly which is designed for flatly supporting either the return or active run of a conveyer belt. The idler includes the end brackets 12 by means of which the idler is attached to the stringers of a belt conveyer frame. Suitably attached to the brackets 12 is the central support or shaft 13 which may take the form of a solid shaft journaled in the brackets 12 or a tubular shell which is supported by gudgeons at its opposite ends or by anti-friction bearings which mount the opposite ends of the shell on a stationary shaft that is attached at its projecting ends to the brackets. Located at suitably spaced intervals along the central support 13 are a desired number of idler rolls 14. Fig. 1 is not intended to illustrate any particular modification or form of roll construction shown in the several remaining figures. It should be considered as representing an idler made up of or including any one of the several roll structures disclosed in detail in Figs. 2 to 8, inclusive. The spacing of the rolls 14 in Fig. 1 is considered as being suitable for supporting the flat return run of a belt conveyer. When the idler of Fig. 1 is employed for supporting the flat active run of a conveyer belt, a larger number of rolls preferably should be employed and these rolls should be spaced at shorter intervals. The rolls 14 of this figure are illustrated as having tire or tread members 15 which are transversely split, and the joints formed by the closely positioned and aligned ends are represented by the lines 16.

Referring now specifically to Figs. 2 and 3, there is shown a fragmentary portion of a central support or shaft 13 on which is mounted an idler roll 14 having a rubber tread or tire 15. The tread or tire 15 is illustrated in section as being shaped to provide a rounded or curved belt engaging tread surface 16 and oppositely projecting clincher beads 17 at its base. Between the tread and base portions the side walls of the tire are shaped to provide annular valleys or grooves 18. The body of the tire may be cored out at 19 for the purpose of reducing the amount of material required.

This idler roll also includes a two-part mount 20 which is interposed between the tire 15 and the central support 13 and functions to detachably mount the tire on the support. In this form of the invention, the two parts of the mount consist of pressed steel plates which are of identical construction. By oppositely arranging these two identical plates, a complete mount is formed.

Each part or plate of the mount is provided with a central opening that is formed by the laterally projecting flange 21. The openings provided by these flanges are intended to be of suitable diameter to cause the flanges to firmly bear upon the periphery of the central support or shaft 13. These flanges, therefore, form extended bearing areas for the roll. Radially outwardly of these mounting flanges 21, each plate or part is formed with a web 22. The webs of the two parts are shown in Fig. 3 as being arranged in parallelism. Outwardly of the webs 22, each plate is formed with a tire bead seating and gripping channel 23. It will be noted that these channels have seating portions 24 which lie opposite the gripping portions 25. Radially outwardly of the channel 23, the plates are formed with laterally flared flanges 26 which underlie the tread portion of the tire to provide adequate support for the same.

The central hole supporting flange 21 of one of the plates or mount parts is welded at 27 to the central support or shaft 13 to definitely anchor the roll in its desired location on the support. The second plate or mount part is separably attached to the anchored plate by means of the bolts and nuts 28. As a result of this arrangement, a completely assembled roll will be prevented from movement axially of the support 13. The tire or tread member will be clamped between the separably and adjustably connected mounting plates or parts and will be centered with respect to the support or shaft 13. As the tire 15 is split, it may be removed from or assembled on its mount by manipulation of the movable plate relative to the anchored plate.

Fig. 4 discloses an idler roll structure which is very closely related to the structure shown in Figs. 2 and 3. In fact, the only difference is in the formation of the side plates or parts of the tire mount which form the shaft receiving opening or the bearing for the roll on the shaft or center support 13. For that reason, the same reference characters will be applied to identify portions which are of the same construction as those shown in Figs. 2 and 3. New reference characters will be applied to the modified parts.

To mount this roll on the central support or shaft 13, one side plate or mount part has a base flange 29 which is of cylindrical shape and is bent laterally inwardly instead of laterally outwardly like the base flanges of the side plates shown in Figs. 2 and 3. This side plate or mount part is welded to the central support or shaft 13, as at 30, for maintaining the desired location of the roll on the central support. The remaining side plate or mount part is not provided with any base flange but terminates in a circular edge 31 which bears directly on the periphery of the support or shaft 13.

In Figs. 5, 6, and 7 there are disclosed three rather closely related modifications of idler rolls. The principal differences between these three structures relate to the cross-sectional design of the tires and the manner of mounting the roll on the central support or shaft 13.

Referring first to Fig. 5, the roll 14 includes a rubber tire 15 having a flat or cylindrical tread surface 32. The base of this tire is formed with laterally projecting clincher beads 33. Between the beads and the tread, the side walls of the tire are formed with annular grooves or recesses 34.

The two part mount for this roll is formed of two separably connected side plates. One of these plates has a web portion 35 which is provided with a laterally inwardly directed base flange 36 of cylindrical shape. This base flange and web are welded to the central support 13 as at 37. Outwardly of the web 35, the side plate is formed with a clincher bead seating and gripping channel 38. This channel includes a seat portion 39 and a gripping flange portion 40. The gripping flange portion enters the groove or depression 34 of the tire and lies opposite the seating portion 39 to grip the clincher bead 33 of the tire.

The remaining side plate or mount part is provided with a web portion 41 which is not formed with a base flange. This web portion terminates in a circular edge 42 which bears directly on the central support 13. Outwardly of the web 41, this side plate is of identical construction to the side plate which was previously described. Therefore, the same reference characters will be applied to this tire bead seating and gripping channel portion 38.

The modification of Fig. 6 differs from the structure disclosed in Fig. 5 by having a circumferentially grooved tread surface for the tire 15 and by having laterally outwardly directed base flanges 44 formed on the side plates for defining their bearing on the central support or shaft 13. In other words, the side plates or mount parts of this roll structure are of identical shape and one side plate is reversed with respect to the other when it is mounted on the central support. The remaining parts of the tire 15 and the mount are of the same construction as shown in Fig. 5 and for that reason the same reference characters will be applied to these parts.

In Fig. 7, the mount for the roll is of the same construction as that disclosed in Fig. 6 with the single exception that the web portions 35 and 41 are of less depth than the web portions of the side plates shown in Fig. 6. These shallower web portions accommodate a tire of greater depth or thickness in a radial direction. The two web portions 35 and 41 have their base flanges 44 bearing directly on the central support or shaft 13 and one of these base flanges is welded at 37 to this central support. Tire bead seating and grippping channels 38 are formed outwardly of the web portions 35 and 41. These channels are provided with tire bead seating parts 39 and bead gripping parts 40.

The tire 15 is formed with laterally projecting clincher beads 45 at its base. The tread is circumferentially grooved at 46. Relatively wide depressions or grooves 47 are formed in the side walls of the tire. These wide grooves or depressions render the tread portion of the tire more flexible than is the case where the side depressions or grooves are narrow, as in Figs. 5 and 6.

Fig. 8 discloses an idler assembly which includes a central support or tubular steel shell 13 which is mounted at its opposite ends on gudgeons 48, one of which is shown. Two slightly modified forms of roll mounts are illustrated in this figure. The idler may be constructed with the two different types of mounts, as has been illustrated, or the idler may be considered as having all of its rolls provided with either one of these two different mounts.

Starting with the right-hand roll assembly, it will be seen that the tire 15 is provided with a rounded tread surface 49. The base of this tire is formed with laterally projecting clincher beads 50. The beads and the tread are separated by side depressions or grooves 51.

The side plates or mount parts are formed with parallel web portions 52. Laterally outwardly projecting base flanges 53 are formed at the inner edges of the web portions 52 to define the central openings or bearing surfaces to receive the central support or shaft 13. One of these base flanges is welded to this support 13 at 54. Outwardly of the webs 52, the side plates are provided with tire bead seating and gripping channels 55. Each one of these channels is formed with a tire bead seat portion 56 and a tire bead gripping portion 57. The bolts and nuts 28 pass through suitable openings formed in the webs 52 and draw these web portions toward each other against a spacer ring 58.

The intermediate idler roll of this assembly is of identical construction to the roll assembly just described with the single exception that the relative dimensions of the tire base and tire mount channel portions 56 are such that the bolts and nuts 28 will draw the web portions 52 into engagement with each other rather than into engagement with a spacer ring like that designated by the reference character 58. Therefore, all other reference characters will be applied to the remaining parts which correspond with the parts of the right-hand roll assembly.

The tire mount of the left-hand roll assembly differs from the construction of the mounts in the remaining two rolls. In this left hand assembly, a wider base flange 53a is provided on one of the webs 52a and is welded to the central support 13 at 54. The remaining mount plate is provided with a web portion 52b which has no base flange. This web terminates in a circular edge 59 which bears directly on the periphery of the central support 13. All other parts of the mount and all parts of the tire are the same as is shown in the remaining two roll assemblies, and for that reason like reference characters will be applied thereto.

To review the different modified forms of idler roll constructions, it will be noted that the mounts shown in Figs. 3, 6, 7, and in part in Fig. 8 are formed of identical side plates which are arranged on the central supports 13 in a reversed order with respect to each other. These side plates all have base or mounting flanges which bear directly on the central support. The modifications shown in Figs. 4 and 5 and in the left-hand roll of Fig. 8 have dissimilar side plates. One of these side plates is formed with a relatively wide mounting flange. The other side plate terminates in a circular edge. In the rolls shown in Figs. 4 and 5, the single base flange is turned inwardly so that it acts as a stop or a limiting means for the second side plate, and for that reason determines the movement of the side plates toward each other. In the left-hand roll assembly of Fig. 8, the base flange 53a is turned outwardly and is not employed as a stop because the web portions 52a and 52b of the two side plates are drawn into direct contact with each other. The side plates of the mounts shown in Figs. 3 and 4 are provided with tire tread reinforcing or bracing flanges outwardly of the tire bead seating and gripping channels. The remaining roll mounts do not have these tread reinforcing and bracing flanges. All of the mounts function to grip and seat the clincher beads formed on the bases of the tires. These gripping and seating channels of the side plates, therefore, accurately center the tires with respect to the central support. As the mounts for all of the rolls are interposed between the resilient tires and the central support, the tires do not bear directly on the central support and the radial dimensions of the tires, in section, are such that a minimum amount of tire material may be employed. To provide rolls of different diameters, it is only necessary to vary the depth or height of the web portions of the side plates for the mounts. The central supports for different diametered rolls may be the same, i. e., one diametered central support may be employed for the several standard sizes of idlers. Side plate webs of different heights may be mounted on these standard central supports and in combination with tires of the same radial dimensions, will provide idler rolls of different diameters.

It will be noted that these various idler roll assemblies possess one very desirable feature regarding the manner in which they may be fabricated. The desired number of pairs of mount plates or parts may be threaded onto a central support or shaft over one of its ends. One side plate of each pair then may be spotted or properly located with respect to the length of the central support and welded in place. This partially assembled idler then may be placed in stock to await a future demand for the same. As all of the ports thus far assembled are formed of metal, no care need be exercised in handling and storing to prevent injury to non-metallic parts. When such a partially assembled unit is to be employed to fill an order, a suitable number of tires may be allotted to the idler and secured in place by interconnecting the pairs of mount plates by means of the bolts and nuts. In other words, the tires need not be applied until an idler is being conditioned for delivery to a customer. This will assure fresh tire stock being employed and the tires will be in perfect condition when the idler is delivered to its purchaser.

When a worn or badly damaged tire must be replaced on any of the rolls of an idler which is in service, it is only necessary to loosen the bolts and nuts which are separably interconnecting the side plates of the mount for the damaged tire. The movable one of the two side plates then may be displaced a suitable distance axially of its central support and the worn out or damaged tire may be removed to make room for a new tire. When the new tire is in place, the movable side plates may be drawn up the required distance by means of the bolts and nuts and the replacement has been accomplished. No other part of any of the remaining elements of the idler need be disturbed to make this tire change.

As has been stated above, the tires to be employed as a part of all of the roll assemblies are transversely split so that the tires may be applied to their mounts at the time of filling an order, and the tires may be readily replaced when badly worn or damaged.

It has been determined that the most economical way of manufacturing these transversely split tires is by an extruding method. Figs. 9 and 10 illustrate the principal steps of this tire forming operation. The uncured rubber is extruded through a suitable nozzle 60 which is provided with a material passing opening of proper shape to produce the desired tire cross section. As this uncured rubber 61 is discharged from the nozzle 60, it is spirally wrapped around a suitable mandrel 62. The wrapped rubber stock thus takes the form of a helix. The various convolutions 63 may be placed on the mandrel 62 in any desired manner; i. e., with the adjacent wraps or turns in direct contact with each other or these wraps may be suitably spaced by being placed in grooves formed in the periphery of the mandrel.

When a helix of proper length has been wrapped about the mandrel 62, the rubber stock may be cured or vulcanized in any desired manner. To form tires of this helical length of stock, the various turns or convolutions are cut on the bias, as is indicated by the lines 64 of Fig. 10. Fig. 11 discloses one of these tires 15 which has been cut from the helical stock and is ready to be applied to a roll mount. It will be noted that this tire 15 is of convolute form or with the ends arranged out of alignment. When the tire is mounted on its central support, the side plates of the roll mount will force the ends of the tire into alignment, and the tire then will be in the form of a circle.

The mandrels 62 should be varied in diameter for providing tires to be used in different sized rolls. In other words, the radius of a tire section cut from the helical length of stock should be such that this tire may be applied to its mount without having to contract or compress the base portion of the tire and stretch or expand the peripheral or tread portion.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a belt conveyer idler, a central support, and a series of rolls mounted on said support in axially spaced relation, each of said rolls comprising a resilient, transversely split tire, and a two-part mount interposed between the tire and the support, one part of each mount being rigidly fastened to the central support to maintain the desired spacing between the respective rolls, and means for separably connecting the two parts of each mount to permit its tire to be individually replaced without disturbing any of the other tires and their mounts.

2. In a belt conveyer idler, a central support, and a series of rolls mounted on said support in axially spaced relation, each of said rolls comprising a resilient tire of normal convolute form and a two-part mount interposed between the tire and the support, said mount being constructed to grip and center the tire with respect to the support and to hold in alignment the ends of the tire so that the tire will be circular, one part of said mount being rigidly fastened to the central support to maintain the desired spacing between the respective rolls, and means for separably connecting the two parts of each mount to permit its tire to be individually replaced without disturbing any of the other tires and their mounts.

3. In a belt conveyer idler, a central support, and a series of rolls mounted on said support in axially spaced relation, each of said rolls comprising a resilient tire of normal convolute form cut from a helically shaped length of extruded stock, and a two-part mount interposed between the tire and the support, said mount being constructed to grip and center the tire in radial spaced relation with respect to the support and to hold in alignment the ends of the tire so that it will form a circle having substantially the same radius as that of the original convolute, one part of each mount being rigidly fastened to the central support to maintain the desired spacing between the respective rolls, and means for separably connecting the two parts of each mount to permit its tire to be individually replaced without disturbing any of the other tires and their mounts.

4. In a belt conveyer idler, a central support, and a series of rolls mounted on said support in axially spaced relation, each of said rolls comprising a resilient tire of normal convolute form cut from a helically shaped length of extruded stock, a two-part mount interposed between the tire and the support, one part of each mount being rigidly fastened to the central support to maintain the desired spacing between the respective rolls, and means for separably connecting the two parts of each mount to permit its tire to be individually replaced without disturbing any of the other tires and their mounts.

5. In a belt conveyer idler, a central support, and a series of rolls mounted on said support in axially spaced relation, each of said rolls comprising a resilient, transversely split tire of normal convolute form having a clincher bead on each side of its base, and a two-part mount for each tire interposed between the tire and the central support, each of said mount parts comprising a plate having an opening to tightly fit and bear upon the central support and a tire bead seating and gripping channel at its periphery, the opening in one of said mount parts being formed of a cylindrically shaped flange providing an extended bearing area for the roll, one part of each mount being rigidly fastened to the central support to maintain the desired spacing between the respective rolls, and means for separably connecting the two parts of each mount to permit its tire to be individually replaced without disturbing any of the other tires and their mounts.

6. In a belt conveyer idler, a central support, and a series of rolls mounted on said support in axially spaced relation, each of said rolls comprising a resilient, transversely split tire having a clincher bead on each side of its base, and a two-part mount for each tire interposed between the tire and the central support to center the tire in radial spaced relation with respect to the support, each of said mount parts comprising a plate having an opening to tightly fit and bear upon the central support and a tire bead seating and gripping channel at its periphery, the opening in at least one of said mount parts being formed by a cylindrically shaped flange providing an extended bearing area for the roll, one part of each mount being rigidly fastened to the central support to maintain the desired spacing between the respective rolls, and means for separably connecting the two parts of each mount to permit its tire to be individually replaced without disturbing any of the other tires and their mounts.

7. In a belt conveyer idler, a central support, and a series of rolls mounted on said support in axially spaced relation, each of said rolls comprising a resilient, transversely split tire having a clincher bead on each side of its base, and a two-part mount for each tire interposed between the tire and the central support, each of said mount parts comprising a plate having an opening to tightly fit and bear upon the central support and a tire bead seating and gripping channel at its periphery, the opening in both of said mount parts being formed by cylindrically shaped flanges providing an extended bearing area for the roll, one part of each mount being rigidly fastened to the central support to maintain the desired spacing between the respective rolls, and means for separably connecting the two parts of each mount to permit its tire to be individually replaced without disturbing any of the other tires and their mounts.

8. In a belt conveyer idler, a central support, and a series of rolls mounted on said support in axially spaced relation, each of said rolls comprising a resilient, transversely split tire having a clincher bead on each side of its base, and a two-part mount for each tire interposed between the tire and the central support, each of said mount parts comprising a plate having an opening to tightly fit and bear upon the central support and a tire bead seating and gripping channel at its periphery, the opening in one of said mount parts being formed by a cylindrically shaped flange providing an extended bearing area for the roll and acting as a spacer between the two mount parts, one part of each mount being rigidly fastened to the central support to maintain the desired spacing between the respective rolls, and means for separably connecting the two parts of each mount to permit its tire to be individually replaced without disturbing any of the other tires and their mounts.

CHARLES R. WEISS.